United States Patent
Henrikson et al.

(10) Patent No.: US 7,013,125 B2
(45) Date of Patent: Mar. 14, 2006

(54) REPLENISHMENT OF PREPAID ACCOUNTS DURING MULTIMEDIA SESSIONS

(75) Inventors: Eric Harold Henrikson, Remond, WA (US); Chinmei Chen Lee, Woodbridge, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 695 days.

(21) Appl. No.: 09/877,815

(22) Filed: Jun. 8, 2001

(65) Prior Publication Data

US 2002/0193093 A1     Dec. 19, 2002

(51) Int. Cl.
*H04M 11/00*     (2006.01)
(52) U.S. Cl. ............ 455/406; 455/405; 455/408; 455/409; 379/114.01; 379/114.17; 379/114.16
(58) Field of Classification Search ............... 455/405, 455/406, 408, 409; 379/144.01, 114.17, 379/114.16
See application file for complete search history.

(56) References Cited

U.S. PATENT DOCUMENTS

| | | | |
|---|---|---|---|
| 6,373,930 B1 * | 4/2002 | McConnell et al. | ... 379/114.28 |
| 6,393,269 B1 * | 5/2002 | Hartmaier et al. | .......... 455/406 |
| 2002/0077076 A1 * | 6/2002 | Suryanarayana et al. | ... 455/406 |

* cited by examiner

*Primary Examiner*—Nick Corsaro
*Assistant Examiner*—Minh D. Dao

(57) ABSTRACT

Prepaid accounts are replenished during multimedia sessions using the prepaid accounts without interruption of the multimedia sessions. A prepay server monitors and adjusts prepaid account balances based on usage of communications resources as reported by elements of the communications network (100). If a processor determines that an account balance is low, then a user terminal (102) is notified and a new session is intiated to permit the user to increase the account balance without interrupting the ongoing communications session.

12 Claims, 2 Drawing Sheets

REPLENISHMENT OF PREPAID ACCOUNTS DURING MULTIMEDIA SESSIONS

FIELD OF THE INVENTION

The present invention relates generally to multimedia communications systems, and in particular, to the replenishment of wireless prepaid accounts during multimedia sessions.

BACKGROUND OF THE INVENTION

Wireless communication systems are well known. Wireless communication systems allow mobile radiotelephones to communicate with each other and other networks, such as the Internet and the public telephone network. First and second generation wireless telephone systems are generally constrained in the amount of bandwidth available for communication. This limits capacity and also the types of services that are provided. Third generation wireless systems hold the promise of greater bandwidth and simultaneous communications involving multiple media, thereby increasing capacity and allowing for enhanced services, such as multimedia services. Proposed third generation wireless communications devices include, in addition to a voice communication interface, capability for communication of data and display of data, including video.

Prepaid accounts for voice or data communications are known. Examples of prepaid accounts are calling cards and prepaid cellular accounts. Customers set up prepaid accounts in order to gain access to services without the hassle of bills, contracts, and the need to carry large amounts of cash. Prepaid accounts are cost efficient because services are provided based on the value of the account. Once the value is depleted, the user has the option to replenish the account for additional usage. Prepaid accounts are typically based on a per unit usage charge, for example, $50 for 200 minutes of "talk" time, $1 for each megabyte of data transferred, or $0.50 for each party added to a conference call. One account may be used for multiple services, with the balance being adjusted according to use. When an account approaches a zero balance, the customer is notified of the balance, including, for example, notification by announcement during a telephone call. To add value to the account, a separate communication, such as a telephone call, must be made to the issuer of the account with a credit card payment or additional value must be purchased at a predetermined location.

Unfortunately, when an account needs to be replenished and a customer is using the telephone, the customer must end their call in order to make the telephone call to replenish their account. Or, the customer must end the call and go purchase additional value at a predetermined location. The current process is time consuming and inconvenient.

Therefore, a need exists for a method and system to replenish prepaid accounts during a call.

SUMMARY OF THE INVENTION

A method is provided for replenishing a prepaid account during a communications session. First, a balance for the prepaid account is monitored with respect to a predetermined threshold. The monitoring occurs during a communications session that uses the prepaid account. If the balance for the prepaid account is below a predetermined threshold during this communications session, then a user of the communications session is notified. A user or a service provider preferably sets the predetermined threshold. Preferably, the notification is made via a visual display or audio announcement at the user terminal. After the user is notified, an interactive session is established with the user for adding value to the balance of the prepaid account. The interactive session for adding value is independent of the communications session. Moreover, the communications session continues during the interactive session to add value.

A multimedia communications system that provides for adding value to a prepaid account includes a first processor, a second processor and a third processor. The first processor monitors a prepaid account associated with the user to determine whether a balance for the prepaid account is below a predetermined threshold. The prepaid account is monitored during a first communications session that uses the prepaid account. If the balance is below the predetermined threshold, as determined by the first processor, a second processor notifies a user terminal of the status of the balance. A third processor initiates an interactive session with the user terminal to add value to the balance for the prepaid account. During the interactive session with the user terminal, communications are maintained for the first communications session. That is, the first communications session is uninterrupted during a period when the prepaid account is replenished.

DESCRIPTION OF THE PREFERRED EMBODIMENTS

Figure 1:
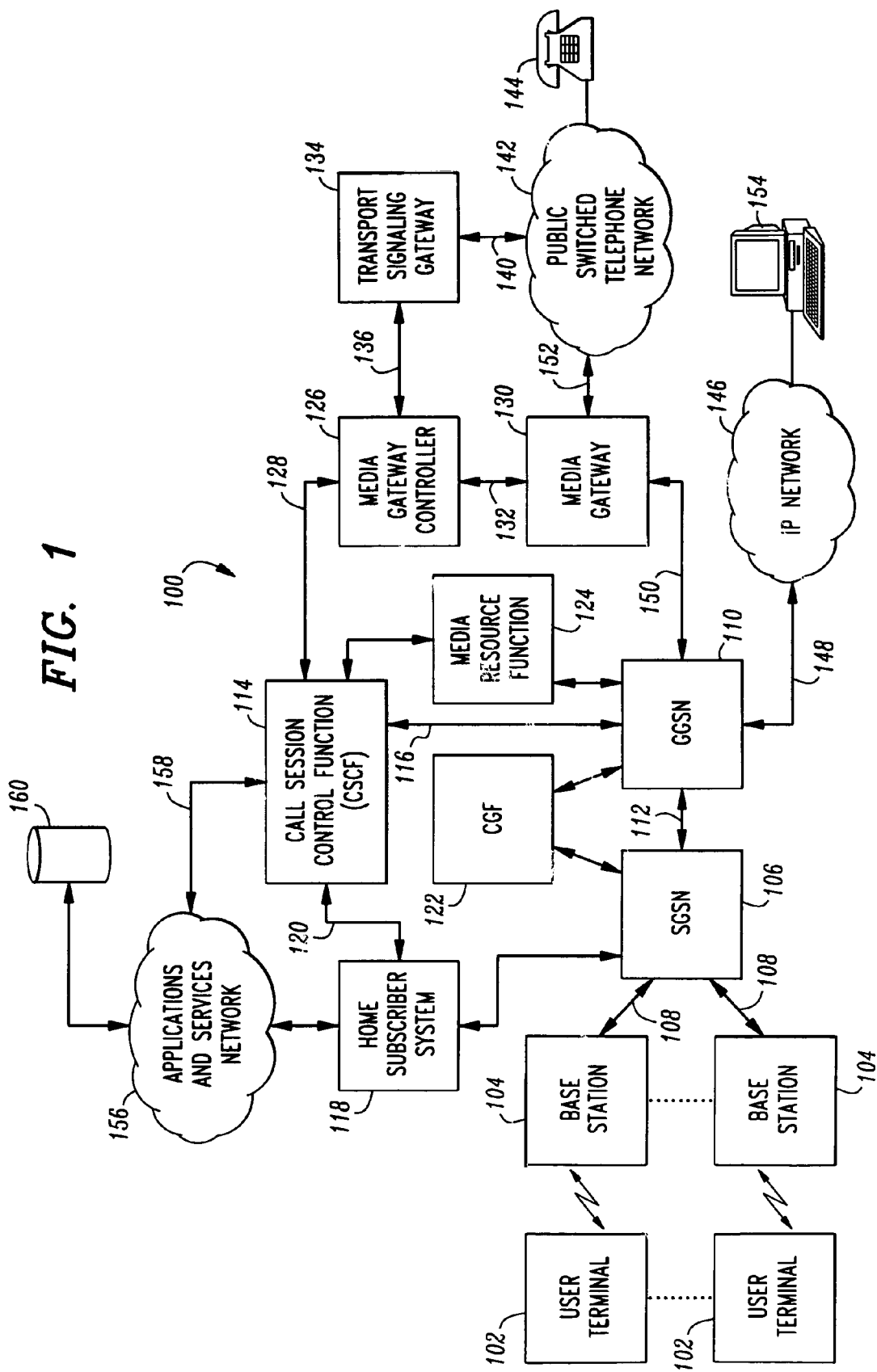
FIG. 1 is a block diagram of a preferred embodiment of a multimedia communications system 100 in accordance with the present invention.

FIG. 1 is a block diagram of a preferred embodiment of a multimedia communications system 100 in accordance with the present invention. Users interact with multimedia communications system 100 via user equipment or user terminals 102. Multimedia communications system 100 includes a third generation wireless system, as defined and proposed by the 3$^{rd}$ Generation Partnership Program, also known as 3GPP (see 3gpp.org). User terminal 102 is typically a mobile device that includes a user interface and an interface for coupling to communications system 100. The user interface of user terminal 102 is typically referred to as terminal equipment and generally includes an audio interface, such as a microphone and speakers, a visual interface, such as a display, and a user input interface, such as a keyboard or touch pad. The interface for coupling to communications system 100 is typically referred to as a mobile terminal and generally includes an over-the-air interface for transmitting and receiving data.

The over-the-air interface of user terminal 102 is used to communicate with base stations 104. In the preferred embodiment, base stations 104 include an over-the-air interface that is complementary to the over-the-air interface of user terminal 102. Most preferably, user terminal 102 and base stations 104 communicate over the air using a packet-based protocol.

Multimedia communications system 100 provides users with a variety of options for communication. Users are able to transmit and receive multimedia communications, including audio, voice, video, and all types of data. Multimedia communications system 100 provides access to data networks, such as the Internet, and public telephone networks, including wireless networks.

In the preferred embodiment, the multimedia communications that are directed to and received from users via base stations 104 are coordinated and transferred using a serving GPRS (GSM Packet Radio System) support node (SGSN) 106, a gateway GPRS support node (GGSN) 110, a call session control function (CSCF) 114 and a home subscriber system 118. SGSN 106 coordinates multimedia transmissions to and from base stations 104. SGSN 106 is coupled to GGSN 110 via a data link 112. GGSN 110 interfaces the multimedia communications to and from SGSN 106 to other networks. Call session control function 114 is coupled to GGSN 110 via a data link 116. Call session control function 114 coordinates and executes a signaling protocol used to establish, maintain and control calls or sessions for communications involving user terminals 102. A home subscriber system 118 is coupled to call session control function 114 via a data link 120. Home subscriber system 118 includes subscriber profile information, including information traditionally associated with a home location register for a mobile subscriber.

To facilitate ancillary and support functions within multimedia communications system 100, a charging gateway function (CGF) 122 and a media resource function 124 are provided. Charging gateway function 122 is coupled to SGSN 106 and GGSN 110 to account for packets passing through these elements for accounting, billing and other purposes. Media resource function 124 is coupled to call session control function 114 and to GGSN 110. Media resource function 124 provides resources for conference bridging, tones, announcements, text-to-speech conversion, automatic speech recognition and other service functions for communications through GGSN 110.

GGSN 110 couples user terminal 102 to other networks. In particular, GGSN 110 is coupled to an Internet protocol (IP) network 146 via a data link 148. Data link 148 preferably implements a packet-based protocol for transfers to a data network. Data link 148 and IP network 146 provide access to any elements connected to IP network 146, such as, for example, a computer 154. GGSN 110 is also coupled to a media gateway 130 via a data link 150. Media gateway 130 is in turn coupled to a public switched telephone network 142 via a communications link 152. Media gateway 130 converts packetized voice received from GGSN 110 to a circuit-switched protocol acceptable to the public switched telephone network 142. Conversely, media gateway 130 converts circuit-switched communications received from public switched telephone network 142 to packetized communications acceptable to GGSN 110. Media gateway 130, data link 150, and communications link 152 provide an interface for user terminal 102 to the public switched telephone network 142. By virtue of this connection, user terminals 102 may be coupled to elements attached to the public switched telephone network, such as telephone 144.

The signaling and control necessary to interface GGSN 110 with public switched telephone network 142 is controlled and provided by call session control function 114, a media gateway controller 126 and a transport signaling gateway 134. Media gateway controller 126 is coupled to call session control function 114 via a data link 128. Media gateway controller 126 is coupled to control media gateway 130 via data ink 132. Call session control function 114 determines based on a signaling protocol any necessary media gateway resources needed for a particular communication or session. These needs are transmitted to media gateway controller 126, which in turns configures and establishes the necessary resources in media gateway 130 and also provides the necessary signaling to transport signaling gateway 134. The resources in media gateway 130 are configured to transfer the actual (bearer) data between the GGSN 110 and the public switched telephone network 142. Transport signaling gateway 134 converts the signaling protocol from the media gateway controller 136 to a signaling protocol necessary for public switched telephone network 142.

Applications and services are preferably coupled to multimedia communication system 100 for use in interaction with user terminals 102. In particular, call session control function 114 is coupled to an applications and services network 156 via a data link 158. Also, home subscriber system 118 is preferably coupled to application and services network 156. A myriad of services and applications may reside in or be coupled to application services network 156, including database services from a database 160.

In the preferred embodiment, SGSN 106, GGSN 110, CGF 122, media resource function 124, CSCF 114, media gateway controller 126, media gateway 130, and home subscriber system 118 are processor-based apparatus with data link interfaces for coupling together as described above and shown in FIG. 1. These apparatus include one or more processors that execute programs to implement the functionality described herein and generally associated with third generation wireless systems.

Figure 2:
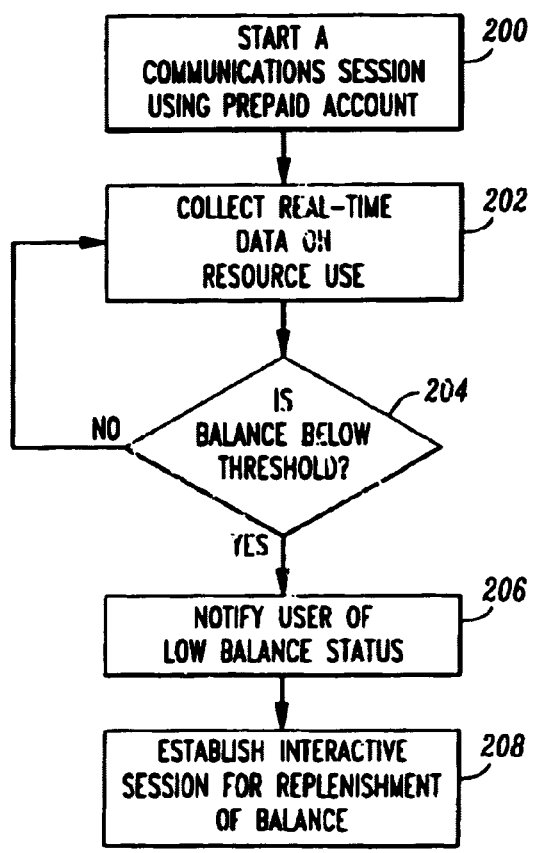
FIG. 2 is a flow chart illustrating a method to replenish a prepaid account balance for a multimedia session in accordance with the present invention.

FIG. 2 is a flow chart illustrating a method to replenish wireless prepaid accounts in a multimedia session in accordance with the present invention. FIG. 2 is discussed below with reference to the preferred embodiment of FIG. 1. First, a new communications session involving a prepaid account is started (200). At initiation, a prepay authorization and balance check is completed to insure the communications session is authorized. Preferably, prepay parameters or triggers are sent to the appropriate processors, including call session control function (CSCF) 114, SGSN 106 and/or GGSN 110. The real-time data on resource use is collected (202). In other words the prepaid account balance is monitored. This preferably entails CSCF 114, SGSN 106 and/or GGSN 110 periodically sending information on resource consumption as directed by a processor serving as a prepay server. Most preferably, the prepay server does the actual account balance checks and adjustments by translating resource usage to monetary amounts. The adjustment to the account balance may be a function of time of day, called party, or other parameters. CSCF 114, SGSN 106 and GGSN 110 may send data back directly to the prepay server or indirectly via the charging gateway function 122. The prepay server is preferably a server in applications and services network 156. Preferably, CSCF 114 reports call control related data, such as minutes used, called party number and conference facilities used. SGSN 106 and GGSN 110 preferably report data such as bytes sent or received for data sessions. In alternate embodiments, the home subscriber system may provide account information. Also, charging gateway function 122 may provide some accounting function.

A determination is made as to whether the prepaid account balance is below a predetermined threshold (204). The predetermined threshold is alternatively selected by a user or by a service provider. Preferably, the prepay server in applications and services network 156 adjusts the account balance according to usage and compares the account balance to the predetermined threshold. If the account balance is below the predetermined threshold, then the user is notified (206). In the preferred embodiment, the notification is displayed on user terminal 102 or made audible on user terminal 102. For example, text or an image appears on the display of user terminal 102 indicating the balance. Or, an announcement of the balance is made audible on user terminal 102.

Next, the user is given the opportunity to start a session to replenish the account (208). In the preferred embodiment, a SIP (Session Initiation Protocol) INVITE message (as defined by Internet Engineering Task Force—IETF-RFC 2543) is sent to user terminal 102 to initiate a session for replenishment of the prepaid account. Most preferably, the user is offered selectable options for replenishing the account. Optional session formats include an interactive text, audio or video session or a connection over a data network, for example, to a Web site. Replenishment is alternatively accomplished by authorizing a withdrawal from or charge to a pre-subscribed account, such as a credit, debit or bank account. Or, a credit card or bank account for debiting may be submitted during the session. In any event, the user accepts the SIP invitation to complete the session for replenishment of the prepaid account. Most preferably, credit card or other account verification and approval is accomplished electronically by data communications with a financial institution or other institution, with approval or non-approval being communicated to the user.

Advantageously, the first communications session continues during the session for replenishment of the account. For example, if a user is engaged in a two-way voice conversation when the prepaid account reaches the predetermined threshold, the user may replenish the balance in the account through an independent interactive text session on the user terminal without interrupting the two-way voice conversation. If the user does not replenish the prepaid account and the balance reaches zero, the first communications session is terminated. Preferably the prepay server communicates this termination condition to CSCF 114, which terminates the communications session.

The present invention allows a user to replenish a prepaid account during a multimedia session. When a user is engaged in a multimedia session, a processor notifies the user about a low balance in the prepaid account. A new interactive session provides an option for replenishing the account during the multimedia session. During replenishment, the user can continue the multimedia session. That is, the user does not have to end the session and make a separate phone call to replenish the account.

Whereas the present invention has been described with respect to specific embodiments thereof, it will be understood that various changes and modifications will be suggested to one skilled in the art and it is intended that the invention encompass such changes and modifications as fall within the scope of the appended claim.

What is claimed is:

1. A multimedia communications system that provides for adding value to prepaid accounts comprising:

a first processor that monitors a prepaid account associated with a user terminal to determine whether a balance for the prepaid account is below a predetermined threshold during a first communications session that uses the prepaid account;

a second processor that notifies a user terminal of a status of the balance if the balance is below the predetermined threshold; and a third processor that initiates an interactive session with the user terminal to add value to the balance for the prepaid account while communications are maintained on the first communications session, where the interactive session is independent of the first communications session.

2. The system of claim 1 wherein the first processor, the second processor and the third processor are a same processor.

3. The system of claim 1 wherein at least two of the first processor, the second processor and the third processor are a same processor.

4. The system of claim 1 wherein the second processor notifies the user terminal by causing display of at least one of a visual and audible indication on the user terminal.

5. The system of claim 1 wherein the interactive session includes a user providing a credit card payment.

6. The system of claim 1 wherein the interactive session includes at least one of a text response, a two-way voice communication and a connection to a data network.

7. The system of claim 1 wherein the interactive session includes a user authorizing use of an account previously associated with the prepaid account.

8. A method for replenishing a prepaid account during a communications session, the method comprising the steps of:

determining whether a balance for a prepaid account is below a predetermined threshold during a first communications session that uses the prepaid account;

if the balance is below the predetermined threshold, notifying a user of a status of the balance; and the initiating an interactive session with the user to add value to balance for the prepaid account while maintaining communications on the first communications session, where the interactive session is independent of the first communications session.

9. The method of claim 8 wherein the step of notifying a user includes causing display of at least one of a visual and audible indication on a user terminal.

10. The method of claim 8 wherein the interactive session includes the user providing a credit card payment.

11. The method of claim 8 wherein the interactive session includes at least one of a text responses a two-way voice communication and a connection to a data network.

12. The method of claim 8 wherein the interactive session includes the user authorizing use of an account previously associated with the prepaid account.

* * * * *